United States Patent [19]

Heider et al.

[11] Patent Number: 5,552,670

[45] Date of Patent: Sep. 3, 1996

[54] METHOD OF MAKING A VACUUM-TIGHT SEAL BETWEEN A CERAMIC AND A METAL PART, SEALED STRUCTURE, AND DISCHARGE LAMP HAVING THE SEAL

[75] Inventors: Juergen Heider, Munich; Stefan Juengst, Zorneding; Roland Huettinger, Jesenwang, all of Germany

[73] Assignee: Patent-Treuhand-Gesellschaft F. Elektrische Gluehlampen mbH, Munich, Germany

[21] Appl. No.: 160,615

[22] Filed: Dec. 1, 1993

[30] Foreign Application Priority Data

Dec. 14, 1992 [DE] Germany .................. 42 42 122.5

[51] Int. Cl.⁶ .................. H01J 9/32; H01J 61/36; H01J 5/26
[52] U.S. Cl. .................. 313/625; 313/624; 313/623; 445/23; 445/26; 445/43
[58] Field of Search .................. 313/623, 624, 313/625; 445/23, 26, 38, 43, 44

[56] References Cited

U.S. PATENT DOCUMENTS

| | | |
|---|---|---|
| 4,011,480 | 3/1977 | Jacobs et al. . |
| 4,342,938 | 8/1982 | Strok . |
| 4,376,905 | 3/1983 | Kerekes . |
| 4,545,799 | 10/1985 | Rhodes et al. . |
| 4,560,903 | 12/1985 | Sneijers et al. .................. 313/625 |
| 5,208,509 | 5/1993 | Snellgrove et al. .................. 313/624 |

FOREIGN PATENT DOCUMENTS

| | | |
|---|---|---|
| 0087830 | 9/1983 | European Pat. Off. . |
| 0136505 | 4/1985 | European Pat. Off. . |
| 2173092 | 10/1973 | France . |
| 1465212 | 2/1977 | United Kingdom . |
| 1545385 | 5/1979 | United Kingdom . |

OTHER PUBLICATIONS

Patent Abstracts of Japan, Unexamined Applications, M Section, vol. 3, No. 116 (M–74), Sep. 27, 1979, The Patent Office Japanese Government.

Primary Examiner—Nimeshkumar D. Patel
Attorney, Agent, or Firm—Frishauf, Holtz, Goodman, Langer & Chick, P.C.

[57] ABSTRACT

A vacuum-tight seal, particularly for an arc tube or discharge vessel for a metal halide or sodium high-pressure discharge lamp, is made by forming the arc tube of transparent ceramic, typically $Al_2O_3$, having two open ends, into which connecting plugs (3), with central openings, are sealed. Open metal tubes (4) fitting into the openings of the plugs (3) are then vacuum-tightly sintered therein. An electrode system (5, 10, 10'), forming a subassembly with a current supply lead or lead-through (6, 11, 14, 15, 20, 24) is provided, having an outer diameter fitting into the metal tube. After mounting one of the electrode systems and lead-through into the metal tube (4), and welding the lead-through to the metal tube, the vessel can be evacuated through the still open tube (4) at the other end, supplied with suitable fill substances and an ignition gas, such as argon or xenon, and the second electrode system then introduced, and welded, for example by a laser, to the outer end of the other metal tube (4). The arrangement permits use of molybdenum tubes, molybdenum lead-throughs, in $Al_2O_3$ ceramic, in spite of different thermal coefficients of expansion. Preferably, the metal tube extends beyond the end face of the vessel and/or sealing plug (3), to permit free access during the welding step and reduce heat transfer into the interior of the arc tube or discharge vessel (1).

22 Claims, 4 Drawing Sheets

METHOD OF MAKING A VACUUM-TIGHT SEAL BETWEEN A CERAMIC AND A METAL PART, SEALED STRUCTURE, AND DISCHARGE LAMP HAVING THE SEAL

Reference to related applications, the disclosures of which are hereby incorporated by reference, assigned to the assignee of the present application:
U.S. Ser. No. 07/912,526, filed Jul. 13, 1992, Bunk et al; now U.S. Pat. No. 5,404,078, Apr. 4, 1995.
Reference to related patents, the disclosures of which are hereby incorporated by reference:
U.S. Pat. No. 4,011,480, Jacobs et al
U.S. Pat. No. 4,342,938, Strok
U.S. Pat. No. 4,376,905, Kerekes
U.S. Pat. No. 4,545,799, Rhodes et al
Reference to related patent:
British 1,465,212, Rigden.

FIELD OF THE INVENTION

The present invention relates to a method to make a vacuum-tight seal between a ceramic element having a tubular opening and a metal element passing through the tubular opening, and more particularly to a method and a seal to seal current supply leads into an end portion of a ceramic arc tube or discharge vessel of a discharge lamp.

BACKGROUND

Arc tubes or arc vessels for high-pressure discharge lamps may use ceramic discharge vessels to enclose the arc under high pressure conditions. Such vessels are used for sodium high-pressure discharge lamps and, recently, the advantages of such vessels have led to their use in metal halide discharge lamps. These lamps, customarily, have a discharge vessel made of quartz glass. To improve the color rendition of the light output, higher operating temperatures than those which can be tolerated by quartz glass are necessary and, therefore, ceramic enclosures for the arc tubes or discharge vessels are desirable. The power ratings involved are between about 50 to 250 W. Customarily, the discharge vessels are elongated and have two ends which are of tubular shape. Current supply leads pass through the ends, for example through cylindrical, ceramic plugs closing the ends. The current supply leads, to which electrodes can be attached, or which have electrodes at their ends, then pass through the end plugs.

Tubular, as well as pin or rod-like lead-throughs of niobium have been used in sodium high-pressure discharge lamps, see for example British Patent 1,465,212, Rigden, and U.S. Pat. No. 4,376,905, Kerekes. The niobium pin or tube is melt-sealed in a ceramic end plug by a glass solder or by a melt ceramic. It has also been proposed (see U.S. Pat. No. 4,545,799, Rhodes et al, to which European Patent 0 136 505 corresponds) to utilize sintering technology for the niobium tube, to provide a direct lead-through connection which is free of glass melt or glass solder. Sodium high-pressure discharge lamps have a peculiarity in that the fill includes a sodium amalgam which frequently is retained in a reservoir in the interior of the niobium tube used as a lead-through for electrical energy into the interior of the vessel.

A particularly simple solution to fill and evacuate the discharge vessel utilizes a small opening formed in one of the two niobium tubes fitted in the respective ends of the discharge vessel. The small opening is located in the vicinity of an electrode shaft and open to the interior of the discharge vessel. Evacuation of the interior of the vessel and fill of the amalgam and introduction of an inert gas is possible through such a tube, see U.S. Pat. No. 4,342,938, Strok, to which British Patent 2,072,939, Strok, corresponds. After filling the lamp, the end of the niobium tube which extends beyond the discharge vessel is closed by a pinch or press operation, and then welded, to be gas-tight. This leaves the opening in the interior of the vessel, in the vicinity of the electrode shaft, still free. During operation, a connection is available between the interior of the discharge vessel and the interior of the lead-through tube, forming a cold spot.

U.S. Pat. No. 4,011,480, Jacobs et al, to which German Patent 25 48 732, corresponds, describes another technology to close off the open ends of a sodium high-pressure discharge lamp. Tubular current lead-throughs of tungsten, molybdenum or rhenium are used, melt-sealed in the plug closing off the vessel openings. A ceramic, cylindrical pin located in the interior of the tube is melt-sealed, gas-tightly in the tubular lead-through. The external end of the tube is not pinched or closed after termination of the filling process. Since the metals used, tungsten, molybdenum or rhenium, are brittle, they can be worked on only with great difficulty, in contrast to niobium. Thus, termination technologies which are known and have been used with niobium tubes cannot be readily transferred for use with the brittle materials. Rather, the ceramic central pin is formed with an axial bore which, upon evacuation and filling, cooperates with an opening in the tube in the vicinity of the electrode shaft. After the filling, the axial bore of the central pin is closed by a melt ceramic. Thus, the brittle metal need not be worked on.

This technology is difficult to carry out, time-consuming and expensive in production.

U.S. application Ser. No. 07/912,526, filed Jul. 13, 1992, Bunk et al, now U.S. Pat. No. 5,404,078, Apr. 4, 1995, assigned to the assignee of the present application (the disclosure of which is published in European Application 92 114 227.9) discloses a high-pressure discharge lamp with a ceramic discharge vessel having a tubular current supply of molybdenum or the like, which is directly sintered in a ceramic end plug. International Application PCT/DE 92/00372, in which the United States is designated, U.S. application Ser. No. 08/211,608, filed Apr. 7, 1994, Heider et al, now U.S. Pat. No. 5,484,315, Jan. 16, 1996, assigned to the assignee of the present application, discloses a method of filling a metal halide discharge lamp having a ceramic discharge vessel in which an opening is formed in either the lead-through or in the discharge vessel or in a closing plug to form a bore for a fill. As described, two ends of the discharge vessels are fitted with electrode systems and sealed, with a filling bore near the pump end of the tube remaining open, the bore being closed after the tube has been filled. The additional opening in the discharge vessel or in the end plug must first be formed and then closed. If the opening is made in a tubular lead-through, the electrode secured to the tubular lead-through decreases the clear diameter of the tubular lead-through available for introducing the fill, and may seriously interfere with the filling process. Closing off the additional filling opening or bore is time-consuming and requires sophisticated techniques.

Direct sintering of lead-throughs, when used for sodium high-pressure discharge lamps, has a problem in that, during sintering, temperatures of more than 1800° C. arise. Usually, the electrodes of such lamps include emitter material which may vaporize at the high sintering temperature.

For automatic manufacture in series or mass production, it is necessary that electrode systems are available at the time the end plugs are sintered. If the individual process steps are carried out at different locations, transport of the electrode systems to the vessels is necessary, and the possibility of damage to the electrode systems during transport is considerable. Flexibility with respect to the use of specific electrodes and electrode systems in particular vessels also is limited.

THE INVENTION

It is a basic object of the present invention to provide a reliable and long-term gas-tight bond or connection between a ceramic element having a tubular opening and a metal element passing therethrough, and more particularly to provide a reliable connecting technology which is resistant to the extreme loadings arising in ceramic discharge vessels for high-pressure discharge lamps having a fill which is aggressive and attacks materials in contact therewith. Specifically, the evacuation and fill of ceramic discharge vessels should be simplified to permit mass production. It is a further object to provide lamps which have a long operating life.

Briefly, an open metal tube which has a thermal coefficient of expansion less than that of the ceramic element is introduced into a tubular opening of the ceramic element which, typically, is a bulbous discharge vessel; a sealing element may be interposed between the discharge vessel and the metal tube, in the form of a ceramic hollow, tubular plug. In a second step, a metal element, which may be a complete electrode-feedthrough-system comprising as the feedthrough a pin or part-tube— part-pin or rod of a metal having a thermal coefficient of expansion less than that of the ceramic element, is introduced into the open metal tube. The end portions of the open metal tube and the pin forming the metallic element, typically the end of the electrode pin or rod, for example, are then vacuum-tightly connected together to close the slight gap necessary to permit sliding the electrode rod through the metal tube. Welding, especially by a laser, is suitable. At least one end of the discharge vessel is closed in this manner; namely that end which is used for evacuation and introduction of a fill prior to the step of introducing the electrode assembly into the open metal tube. It is possible to close the second end, which is the blind end, in a similar manner.

Preferably, and in order to avoid exposing the discharge vessel and the seal to high temperatures when the electrode system is already in the vessel, both the metal tube as well as the electrode pin or rod extend beyond the end of the discharge vessel and/or the closing plug, so that the welding step is carried out spaced from the end of the discharge vessel as such. The discharge vessel, also, can be cooled during the welding step.

The method in accordance with the present invention, which is particularly suitable for lamps and other electrical apparatus, especially discharge tubes, eliminates the problems which arose in connection with the technology discussed above. Sealing of the ceramic vessel is carried out in a plurality of separate steps by use of an additional element, namely the open metal tube. Preferably, the metal tube is made of molybdenum or an alloy thereof. Generally, however, the tube may be made of another material having characteristics similar to molybdenum, namely high resistance to corrosion, that is, resistance to attack by a fill within the tube and a low thermal coefficient of expansion. Tungsten or rhenium are other suitable metals, although they are more difficult to work than molybdenum. In the discussion that follows, reference will be made, generally, to a molybdenum tube as the preferred material, it being understood, however, that the technology is equally applicable to tubes made of other metals.

In a preferred method, the tubular element, typically a molybdenum tube, is first directly sintered into the ceramic vessel, which can be pre-shaped to form a discharge vessel or arc tube. The tube is sintered either in a plug which is, in turn, sealingly connected for example by sintering to the end of the discharge vessel, or to an end portion of the sealing vessel directly. Usually, and preferably, a separate sealing element in form of an end plug is used; this arrangement has been found suitable, and is described in the prior art. When making discharge lamps, the plug is usually made of the same material as the translucent ceramic of the arc tube itself. The arc tube is made of translucent aluminum oxide, $Al_2O_3$, with or without doping materials. The coefficient of expansion of the ceramic aluminum oxide arc tube is, in general, between about 6.5 to $9 \times 10^{-6}$ $K^{-1}$. The coefficients of expansion of the ceramic vessel and of the end plug may be closely the same. The end plug may be a single-component material or a multi-component material which primarily is made of ceramic but may contain up to about 40% additives which reduce the thermal coefficient of expansion, so that the thermal coefficient of expansion will be well between that of the ceramic discharge vessel and the metallic tube, for example the molybdenum tube. The referenced U.S. application Ser. No. 08/211,608, filed Apr. 7, 1994, Heider et al, now U.S. Pat. No. 5,484,315, Jan. 16, 1995, is here referred to. In some cases, direct sintering of the plug to the ceramic vessel is not needed and a melt connection can be used.

The technology of direct sintering is described in U.S. application Ser. No. 07/912,526, Bunk et al, filed Jul. 13, 1992, now U.S. Pat. No. 5,404,078 the disclosure of which is hereby incorporated by reference. This technology has the basic advantage that the use of a melt glass or glass solder can be avoided. Melt glass or glass solder especially under high-temperature conditions, is not fully resistant to attack by the fill in many lamps, and is subject to corrosion.

The metallic element, in a lamp a feedthrough which may be part of an electrode assembly, is introduced into the molybdenum tube, sintered to the ceramic element, in a lamp the discharge or arc vessel, directly or by means of an intermediate plug. This metallic element is a current lead-through as customarily used in discharge lamps and arc lamps. The metallic element, which in a lamp is often part of an assembly including also the electrode, is made to match and fit within the molybdenum tube, possibly with a little clearance, just enough to permit insertion into the molybdenum tube. The outer diameter of the metallic element, thus, or the outer dimension is fitted to the molybdenum tube. This metallic element can be a solid pin or rod, or may itself be tubular or part-tubular. It can be a unitary element or a composite of various parts. The material of which the metallic element is made has a thermal coefficient of expansion which can be substantially less than that of the ceramic element, up to about 60% and for some applications, even more than 60% less than that of the ceramic element. Preferably, the material should be resistant to corrosion or attack by metal halides and sodium within the discharge vessel or arc tube. Molybdenum, tungsten and rhenium are suitable. The thermal coefficients of expansion of these materials is between about 4 to $5 \times 10^{-6}$ $K^{-1}$.

It is important that the thermal coefficient of expansion of the metallic element, in a lamp the feedthrough corresponds at least generally to that of the molybdenum tube, since in a third closing step sealing of the opening is carried out by bonding together the tube and the metallic element—in a lamp the feedthrough—preferably in the region of the outer end of the molybdenum tube. In discharge lamps, this is the end which is remote from the discharge space. This has substantial production advantages. Bonding is preferably carried out by welding. The outer end of the molybdenum tube as well as of the electrode assembly is easily accessible, and the quality of the weld can thus be readily monitored. If materials with substantial differences in thermal coefficients of expansion are to be connected together, high mechanical stresses will occur at the junction or seam or weld upon temperature changes and particularly since very high temperatures arising in operation of discharge lamps occur, which will lead to premature leakage of the seal and, hence, premature failure of the lamp.

Preferably, for lamps the lead-through is bonded to a subassembly which includes the entire electrode system. The diameter of the electrode itself, of course, must be smaller—even if only slightly smaller-than the interior diameter of the molybdenum tube. The electrode system as such must be vacuum-tightly closed to ensure that the third process step can reliably complete the final sealing of the discharge vessel.

The most reliable seal is provided when a massive pin or rod is used as a lead-through, passing through the molybdenum tube. The electrode can be secured at the discharge end of the pin in any suitable manner. This, however, uses substantial quantities of material. To use less material, and as an alternative, the lead-through may use a tube itself, which is closed off at the remote end by a pin or rod element. When used with metal halide lamps, the tube is preferably also closed vacuum-tightly at the discharge side, for example by means of the shaft of the electrode. As a compromise, suitable also for sodium high-pressure lamps, a composite lead-through is suitable, formed of a tubular portion and a pin portion. A tube, with a pin fitted therein, can also be used. Such a pin can preferably also form an externally projecting terminal post for an external current supply.

The method in accordance with the present invention has the advantage that the ceramic vessel can be easily filled with a suitable filling material. Usually, this is an inert gas, such as a noble gas, for example argon or xenon and/or mercury, to initiate and then maintain a discharge between two electrodes located in the ceramic vessel. Further materials can be introduced, such as sodium, for example in the form of a sodium-mercury amalgam,or metal halides. Metal halides are usually introduced in solid form, for example as pellets, through the opening of the molybdenum tube. Introduction is simple and reliable.

The gaseous fill substances are volatile and, thus, it is a particular advantage that the final closing of the vessel can occur in the vicinity of the outer end of the molybdenum tube. Usually, the substances need to be cooled during the closing process to prevent their escape through the still open fill bore. According to the invention, the application time of the necessary energy to effect the closing, for example by welding, can be very short and localized, remote from the fill substance. Danger of heating of the filling substance, thus, can be reliably avoided and special cooling need not necessarily be used. The time and heating is much less than in melt-in processes.

The relative thermal coefficients of expansion of the respective material are important to ensure a reliable seal. Additionally, however, the actual dimensions are also important since differences in thermal coefficients of expansion, when the materials themselves are small, have less effect on the tightness of a seal. Materials and dimensions which provide for the necessary flexibility for a reliable, long-term direct sintering, while also providing a sufficiently large fill opening for fills of the lamp, are for example: molybdenum tubes having outer diameters of from about 1.3 mm to about 2 mm; inner diameters of between about 0.8 mm to about 1.5 mm; the wall thickness of the tubes should be between about 0.1 to 0.3 mm. These dimensions provide for the necessary flexibility and permit elimination of any type of solder or melt substance, such as glass solder or metallic solder or a ceramic melt.

The technology first permits the manufacture of ceramic discharge vessels of lamps which have extremely low mercury content or, even, are completely free of mercury and in which the arc voltage is maintained by a highly increased pressure of a noble gas, typically xenon.

DETAILED DESCRIPTION

Figure 1A:
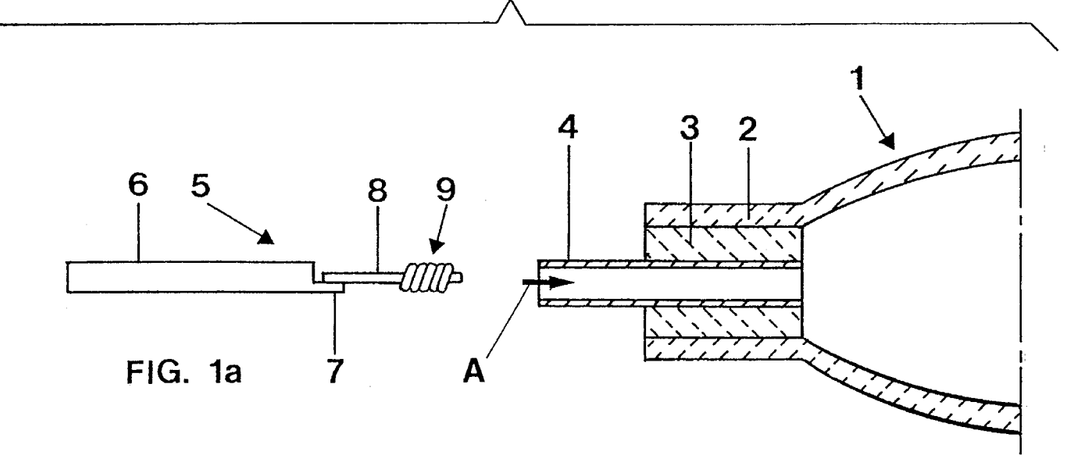
FIG. 1a is a fragmentary cross-sectional view through an end portion of a discharge vessel and illustrating, in exploded form, introduction of an electrode into the end portion.
Figure 1B:
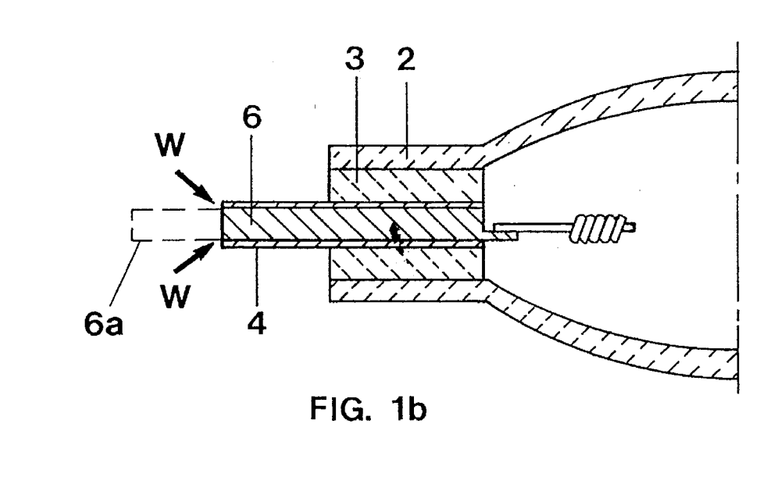
FIG. 1b is a view similar to FIG. 1a, in which the electrode has been inserted into the end portion of the discharge vessel.

Referring first to FIGS. 1a and 1b:

FIG. 1, collectively, illustrates, in fragmentary representation, the end portion of a metal halide discharge lamp. The envelope is made of $Al_2O_3$ ceramic. The end portion 2 of the arc tube 1 of the lamp is closed off by an end plug 3. The end plug 3 is made of a transition ceramic of 60% $Al_2O_3$ and 40% tungsten. The arc tube 1 is bulged outwardly, into generally elongated barrel form. It has an outer diameter in the region of the cylindrical ends 2 of about 5.75 mm. The outer diameter of the end plug 3, which is directly sintered or melt-sealed in the cylindrical end 2 is about 3.25 mm.

In accordance with a feature of the invention, a molybdenum tube 4 is directly sintered into the end plug 3. The molybdenum tube 4 has an outer diameter of 1.65 mm, and an inner diameter of about 1.3 mm. The wall thickness of tube 4 is, then, about 0.175 mm. The molybdenum tube 4 fits snugly into the cylindrical opening in the end plug 3. At the inner, or discharge side of the tube, it is flush with the inner surface of the plug 3. At the outer, or free end, that is, remote from the discharge side, the tube 4 extends beyond the plug 3.

Figure 6:
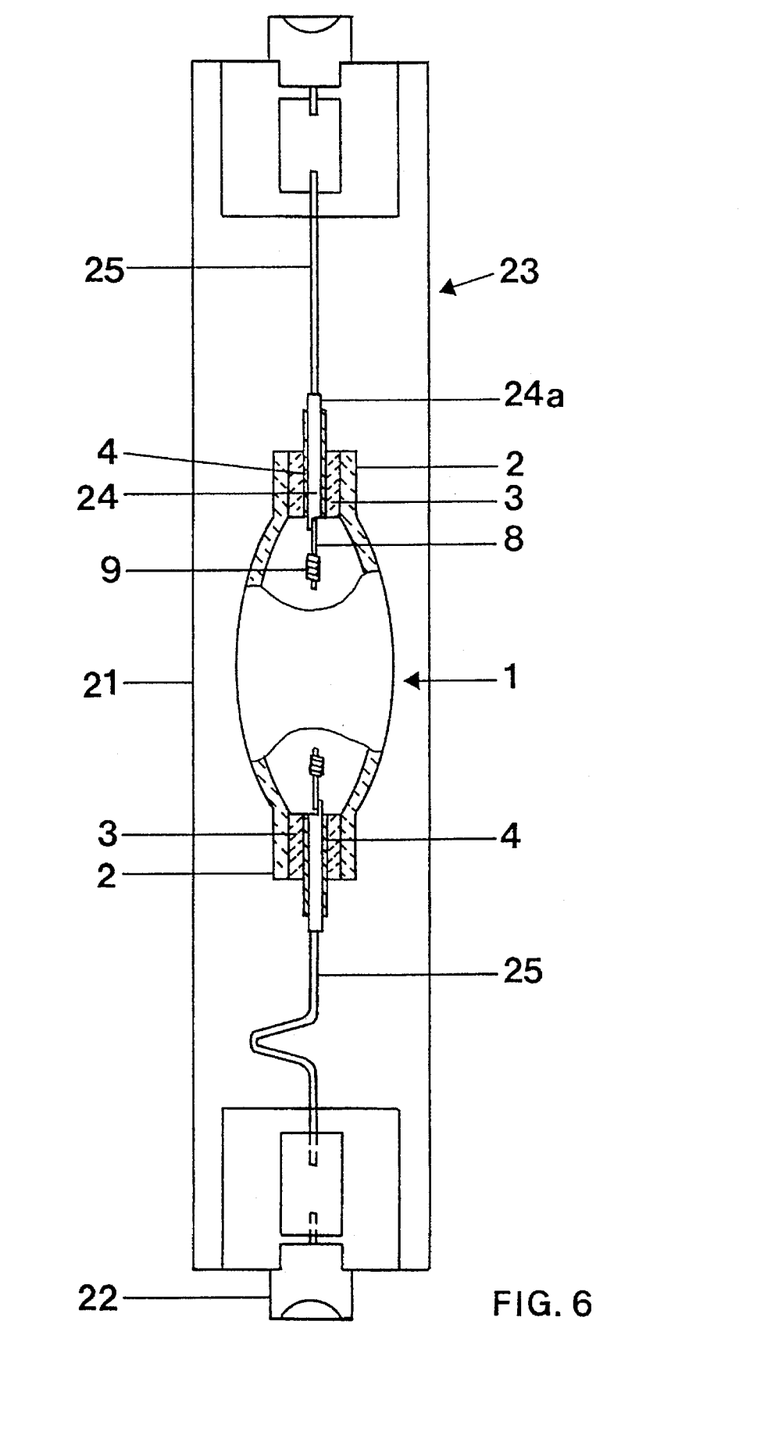
FIG. 6 illustrates, partly in section, a discharge lamp with a ceramic arc tube and utilizing the electrode lead-through arrangement in accordance with the present invention.

The arc tube 1 has, of course, two end portions which are, usually, identical, see FIG. 6.

To make the arc tube with electrodes therein, one of the end portions 2 is first closed off to be vacuum tight. The details of the manufacture of closing, and filling, or only closing the arc tube will be described in connection with FIGS. 1a, 1b. In FIGS. 1a and 1b, it is assumed that the end portion which is not shown is already finished and sealed.

Filling and sealing the arc tube

A vacuum is applied against the open molybdenum tube 4 to evacuate the interior of the discharge vessel 1. When the appropriate vacuum is reached, an inert ignition gas, such as argon or xenon, is introduced into the arc tube 1. Further, suitably dimensioned or apportioned quantities of mercury and metal halides are introduced through the tube 4. The metal halides can be supplied, for example, in forms of pellets. Additional materials, such as metals in the form of wire pins, can also be introduced into the vessel 1 through the tube 4. While carrying out this introduction step, the other end of the discharge vessel which was previously closed—not visible in FIGS. 1a and 1b—is preferably cooled with liquid nitrogen. The open end 2, FIG. 1a, is preferably at the upper side, and the opening is directed upwardly.

An electrode system 5 (see FIG. 1a) is then promptly introduced into the molybdenum tube 4. The electrode system 5 forms a subassembly containing a pin 6. Pin 6 may be molybdenum or tungsten, and has a diameter of about 1.2 mm. The discharge end thereof is formed with a projection 7 on which an electrode shaft or core wire 8 is welded. Core wire 8 has a diameter of about 0.5 mm. The core wire 8 is made of tungsten, and a coil or winding 9 is secured to the outer surface thereof. The outer diameter of the coil 9 does not exceed the outer diameter of the pin 6.

Preferably, molybdenum pin 6 is formed with a small lateral projection extending beyond the interior diameter of the molybdenum tube 4 at the end remote from the electrode 8, 9. Such a projection, to form an abutment, may be for example in the form of three projecting tips, uniformly distributed about the circumference of the pin 6. These projections ensure that the spacing between the electrodes—see FIG. 6—will be accurately maintained and, additionally, ensure preliminary holding of the pin 6 in the tube 4. A projecting end region 6a, shown in broken outline, of pin 6 can be cut off, or left as a connecting terminal (see 24a, FIG. 6).

In accordance with a feature of the invention, the end 2 of the discharge vessel 1 is finally sealed by sealing the insertion gap between the pin 6 and the molybdenum tube 4 by welding. Preferably, the welding is carried out by a laser. The weld is schematically shown by the arrows W in FIG. 1b. A Nd/YAG laser is moved close to and around the gap between tube 4 and pin 6. During this movement, the laser is pulsed, thus providing for complete welding. More than one full circle of movement of the laser around the gap may be used.

Apart from the welding zone, the remaining parts of the electrode system are only very gently heated. Moreover, the application of welding heat is remote from the discharge vessel itself. This gentle heat treatment, thus, does not interfere with the tendency of the fill to escape.

This type of sealing is particularly suitable for discharge vessels or arc tubes which are small, and particularly for very small vessels, for example those which are intended for lamps of power ratings of 50 W or less; likewise, the system is particularly suitable for filling systems having a relatively high fill pressure, for example when xenon forms the fill gas, rather than argon. Of course, the filling system is especially adapted to small vessels using gases requiring high fill pressure. The insertion direction of the electrode system 5 is shown schematically in FIG. 1a by the insertion arrow A.

Figure 2:
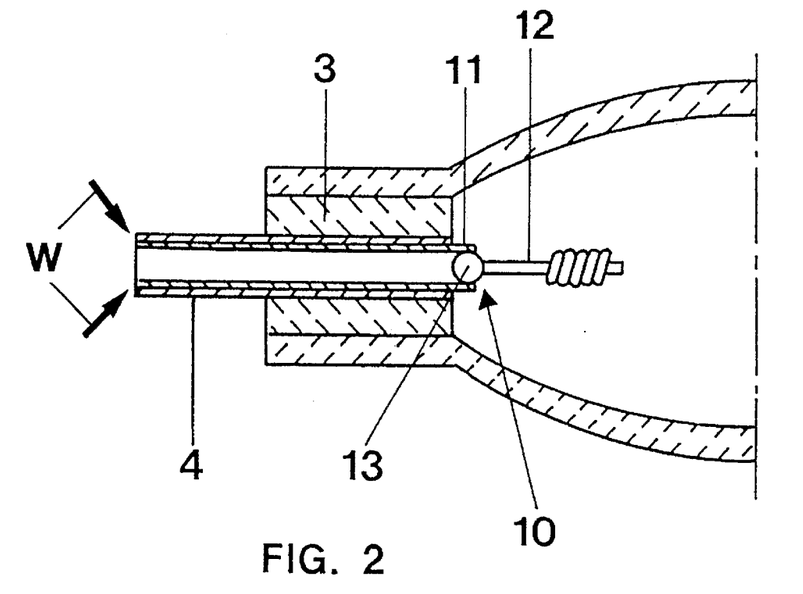
FIG. 2 is a cross-sectional view of another embodiment of an electrode in an end portion of a discharge vessel.

Various differently constructed electrode systems can be used. Referring now to FIG. 2, which shows an electrode system 10: System 10 is composed of a lead-through formed as a molybdenum tube 11, having an outer diameter of about 1.2 mm and an inner diameter of about 1 mm, that is, with a wall thickness of about 0.1 mm. The inner tube 11 slightly extends beyond the molybdenum tube 4 in the interior of the discharge vessel. An electrode shaft 12 is secured to the inner molybdenum tube 11, having a diameter which is substantially less than the interior diameter of the molybdenum tube 11, for example about 0.5 mm. To ensure seating of the core pin or electrode shaft 12, it is melted back to form a ball 13 having a diameter which fits into the inner diameter of the molybdenum tube 11.

In this embodiment, the electrode system 10 is sealed by welding the ball end 13 to the molybdenum tube 11. The attachment of the lead-through tube 11 at the outer end to the molybdenum tube 4 is then done, as explained in connection with the example illustrated in FIGS. 1a, 1b, by laser welding, see arrows W.

Figure 3:
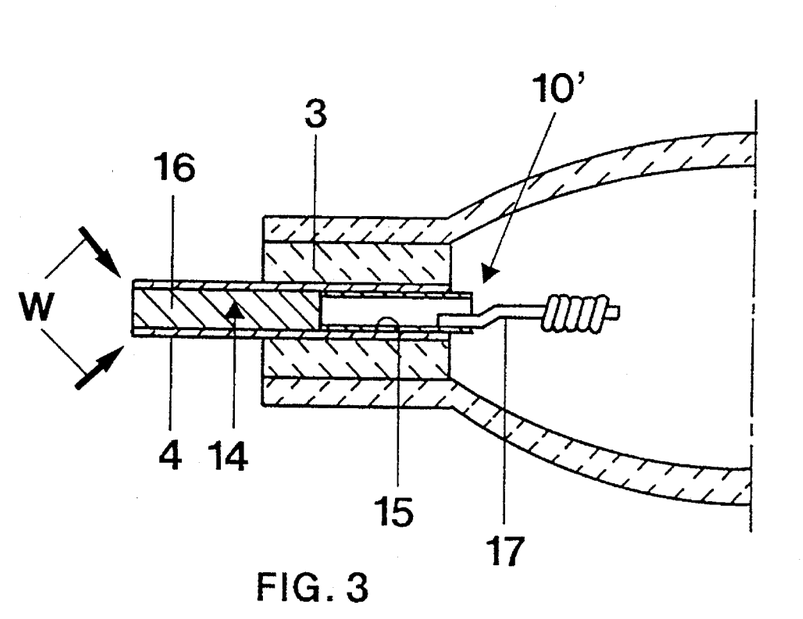
FIGS. 3, 4 and 5 illustrate other embodiments of electrodes secured to end portions of a discharge vessel.

FIG. 3 illustrates another embodiment which is particularly suitable for sodium high-pressure lamps. A combined electrode—lead-through 14 is constructed which has two portions 15, 16. The portions 15, 16 are both of molybdenum. The portion 15 at the discharge side is tubular, and a core pin 17 is secured at the inner wall. The portion 16, remote from the discharge tube, is a pin which is butt-welded to the tubular portion 15. At the weld, the core wire 17 is located somewhat outside of the axis of the lamp, in order to leave an opening which is in communication with the interior of the discharge vessel and can form a reservoir for amalgam. The forward portion, within the discharge space, of the core pin 17 is then slightly offset to be placed in the central axis of the lamp, to facilitate insertion of the electrode system 10', shown in FIG. 3, into the molybdenum tube 4, and to precisely align the discharge end of the electrode on the lamp axis. The remote end of the pin 16 is secured to the molybdenum tube 4 as described in connection with FIG. 1b by weld W.

Figure 4:
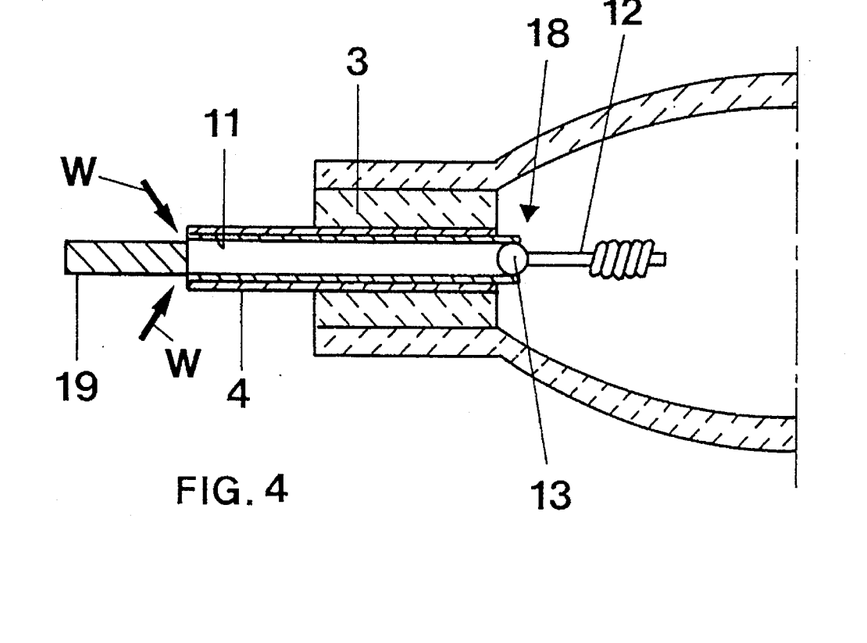

FIG. 4 illustrates another arrangement of a lead-through—electrode system 18. A tubular lead-through 11, similar to lead-through 11 of FIG. 2, has a terminal pin 19 attached thereto. Pin 19 is a molybdenum pin, suitable for attachment to an external current supply lead. Preferably, the terminal pin 19 is welded at the same time when the tube 11 is welded to the tube 4, as illustrated by the welding arrows W. This provides an additional seal for the electrode system 18, which increases the lifetime of the lamp. The first seal is formed by the ball end 13 of the electrode core wire 12 welded in the tubular lead-through 11 as described in connection with FIG. 2.

Figure 5:
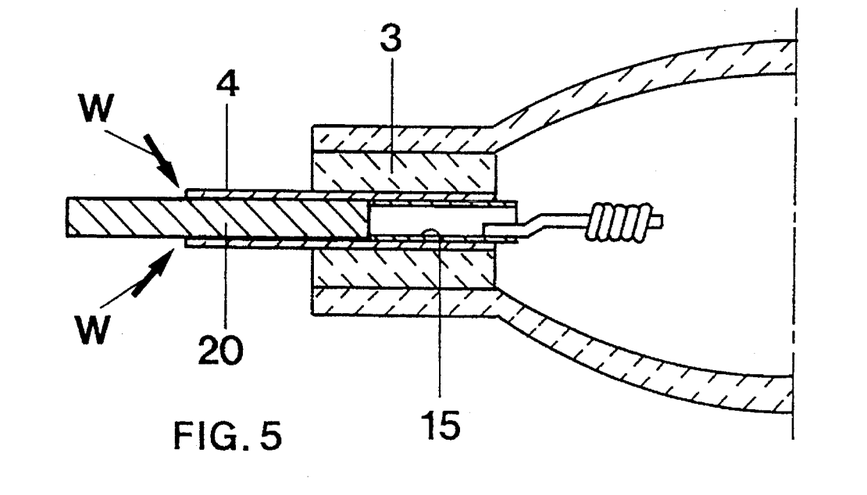

FIG. 5 illustrates another variation in which an electrode system as described in connection with FIG. 3 is further modified by extending the pin 20 beyond the end of the tube 4, to provide an attachment terminal for an external current supply lead. The weld, again, is shown by arrows W, which ensures tightness of the entire system.

The dimensions for the molybdenum tube 4 are not critical; they have to be determined in relation to the wall thickness of the envelope of the vessel 1, the thickness of the plug 3, and the size of the electrode to be put into the lamp. Preferred ranges of the diameters of the molybdenum tube 4 are: outer diameter (OD) about 1.3 to 2.0 mm; inner diameter (ID) from between about 0.5 to 1.25 mm, with wall thicknesses of between about 0.1 to 0.4 mm.

Various features described can be combined. For example, the end 24a (FIG. 6) of a solid pin passing through the tube 4 (FIG. 1b) can be extended to form a terminal lug or other terminal arrangement for external current supply leads 25. As seen in FIG. 6, the discharge vessels described herein are, usually, placed within an external, usually cylindrical envelope 21 made of hard glass. This envelope, in form of a cylinder, is then fitted with ceramic bases 22. The lamp 23 has particularly good color rendition, with a color rendition index Ra of above 90. It uses a metal halide fill.

Various other changes and modifications may be made, and any features described herein may be used with any of the others, within the scope of the inventive concept. The tubular-like opening in the ceramic element may be of circular, oval or a squeezed circular cross-section. The cross-sections of the metal tube and the metallic element are adapted to the cross-section of the opening in the ceramic element so that the three parts can fit together.

We claim:

1. A method of making a vacuum-tight seal between a ceramic arc discharge vessel element, the inside of which is to retain an arc discharge and to be isolated from its ambient environment, said vessel having an end portion (2) formed with an end opening, a sealing plug (3) fitted in said end opening of the ceramic element (1) and formed with a tubular opening therethrough, and a metallic element (6) passing through the tubular opening, wherein the thermal coefficient of expansion of the ceramic material of the sealing plug (3) is between about $6.5 \times 10^{-6}$ $K^{-1}$ and $9 \times 10^{-6}$ $K^{-1}$, wherein the shape of the cross section of the tubular opening of the plug (3) is similar to the shape of the cross section of the metallic element, and wherein the thermal coefficient of expansion of the metallic element (6) is less than that of the plug (3), said method comprising, in accordance with the invention, the steps of (a) vacuum-tightly directly sintering an open metal tube (4), having a cross-section similar to the shape of said tubular opening in the plug (3) and a thermal coefficient of expansion less than that of the ceramic material of said plug (3), into the tubular opening of the plug;

(b) introducing the metallic element (6) into said metal tube (4), said metallic element (6) fitting into said metal tube (4) with a small clearance gap to permit said introducing step; and (c) vacuum-tightly connecting together said metal tube (4) and the metallic element (6) and closing said clearance gap between said metal tube (4) and said metallic element (6) to form a vacuum-tight connection.

2. The method of claim 1, wherein said open metal tube (4) and said metallic element (6) project beyond an end face of said vessel element (1);

and said step (c) of vacuum-tightly connecting together the metal tube and the metallic element comprises welding said metal tube (4) and metallic element (6) together at a position spaced from said end face.

3. The method of claim 1, wherein said sealing plug comprises ceramic material having a thermal coefficient of expansion which is between that of the ceramic vessel element (1) and the metallic element (6).

4. The method of claim 3, wherein said vacuum-tight bonding step comprises sintering or melt-connecting the sealing plug (3) into the end opening of the ceramic vessel element (1).

5. The method of claim 1, wherein said sealing plug comprises ceramic material having a thermal coefficient of expansion which is at least close to that of the ceramic material of the vessel element (1).

6. The method of claim 1, wherein said open metal tube (4) comprises molybdenum or a molybdenum alloy; and wherein said metallic element (6) is molybdenum, a molybdenum alloy, tungsten, a tungsten alloy, rhenium, or a rhenium alloy.

7. The method of claim 1, wherein said step (c) of vacuum-tightly connecting together the metal tube and the metallic element comprises welding and, optionally, laser welding.

8. The method of claim 1, wherein said ceramic vessel element comprises a closed bulb or vessel; and wherein said method comprises, in advance of step (b), the additional step of (a–1) evacuating the bulb or vessel (1) and, optionally, introducing into the bulb or vessel a fill through the open metal tube (4).

9. A discharge vessel for containing an electrical arc, said discharge vessel vessel forming said tubular ceramic element and being made by the method as claimed in claim 8.

10. The method of claim 1, wherein said ceramic vessel element comprises a discharge vessel or arc tube of a discharge lamp;

the metallic element (6) comprises an electrical lead-through, optionally including a subassembly of a premanufactured electrode system (5; 10; 10'; 18), said electrode system including at least one electrode attached to said lead-through (6; 11; 14; 24) in such a manner that the electrode system, as such, is vacuum-tight.

11. A discharge vessel for containing an electrical arc, said discharge vessel forming said tubular ceramic vessel element, and being made by the method as claimed in claim 10.

12. A discharge vessel forming a discharge vessel or arc tube (1) of an electric lamp, said discharge vessel of said lamp being of transparent ceramic and having two facing end portions (2);

ceramic sealing plugs (3), closing off the end portions (2) of the discharge vessel or arc tube;

electrical lead-through means (6, 24) vacuum-tightly passed through said sealing plugs (3);

electrodes (8, 9) located in the interior of the discharge vessel or arc tube (1) and, respectively, connected with the electrical lead-through means (24) in the respective end portion;

external current supply means (25) connected to said lead-through means (24); and a light generating fill within the vessel element, comprising, in accordance with the invention, at least, at one end portion (2, 3), a metal tube (4) and a direct sinter joint of the metal tube (4) to the ceramic sealing plug (3), the lead-through means (6, 24) being inserted in the metal tube (4); and and a vacuum-tight sealing connection between the lead-through means (6, 24) and the metal tube (4) at said at least one end portion (2) of the discharge vessel.

13. The lamp of claim 12, wherein said metal tube (4) extends beyond an outer end face of said plug (3) at least one end portion, and said vacuum-tight sealing connection comprises a weld between the tube (4) and the lead-through (6, 24), spaced from said end face.

14. The lamp of claim 12, wherein said sealing plug (3) is directly sintered or melt-connected to the end portion (2) of the vessel (1).

15. The lamp of claim 12, wherein said open metal tube (4) comprises molybdenum or a molybdenum alloy.

16. The lamp of claim 12, wherein said sealing plug (3) has a thermal coefficient of expansion which is between that of the discharge vessel or arc tube (1) and that of the lead-through (6, 24), and which, optionally, is close to that of the discharge vessel or arc tube.

17. The lamp of claim 16, wherein the discharge vessel or arc tube (1) comprises $Al_2O_3$;

and wherein the sealing plug (3) is a multi-component ceramic material having $Al_2O_3$ as the primary component, with additives, and having a thermal coefficient of expansion which is less than that of $Al_2O_3$.

18. The lamp of claim 12, wherein the lead-through means (6, 11, 14, 24) comprises an essentially circular element of high heat resistant material and low thermal coefficient of expansion which, optionally, is hollow to define a tube (11) or is a composite of solid and hollow portions (14, 15).

19. The lamp of claim 18, wherein the lead-through means (6, 11, 14, 24) comprises, at least in part, molybdenum or tungsten.

20. The lamp of claim 12, further including terminal means (6a, 19; 24a) located on the lead-through means (6, 11, 14, 24) remote from the discharge vessel or arc tube (1), for electrical connection with external current supply means (25).

21. The lamp of claim 12, wherein the metal tube (4) has an external diameter of between about 1.3 to 2 mm, an inner diameter of between about 0.5 to 1.5 mm, and a wall thickness of between about 0.1 to 0.4 mm.

22. The lamp of claim 12, wherein at least one of the electrodes (8, 9) and the lead-through means (6, 11, 14, 24) forms a subassembly comprising an electrode system (5, 10, 10', 18) and a lead-through (6, 11, 14, 15, 20, 24) and defines a unitary vacuum-tight structure.

* * * * *